United States Patent
Mollere

[15] 3,682,154
[45] Aug. 8, 1972

[54] PORTABLE DISPOSABLE CHARCOAL GRILL

[72] Inventor: George A. Mollere, 13350 Dwyer Rd., New Orleans, La. 70120

[22] Filed: Aug. 21, 1970

[21] Appl. No.: 65,882

[52] U.S. Cl. ....................................... 126/9 A
[51] Int. Cl. ........................ F24b 3/00, F24c 1/16
[58] Field of Search ............................ 126/9, 9 A

[56] References Cited

UNITED STATES PATENTS

| | | |
|---|---|---|
| 3,394,693 | 7/1968 | Robinson ........... 126/90 A UX |
| 2,999,494 | 9/1961 | Richardson ................ 126/9 X |
| 3,059,633 | 10/1962 | Laerum ...................... 126/9 X |
| 3,353,527 | 11/1967 | Anderson ............ 126/9 A UX |
| 3,384,066 | 5/1968 | Tufts ............................. 126/9 |

FOREIGN PATENTS OR APPLICATIONS

| | | |
|---|---|---|
| 674,303 | 4/1939 | Germany ....................... 126/9 |
| 482,595 | 1/1917 | France ............................ 126/9 |

Primary Examiner—Charles J. Myhre
Attorney—C. Emmett Pugh

[57] ABSTRACT

A portable and disposable charcoal grill of cardboard lined with aluminum foil; the complete grill can be collapsed and provided in a relatively small, rectangular package with the elements nested together and can be quickly and easily assembled; the bottom of the unit can be used as a food warmer-oven while the top is used for barbequeing; the basic body of the grill can be collapsed flat because of opposing vertical folds provided within its sides.

2 Claims, 5 Drawing Figures

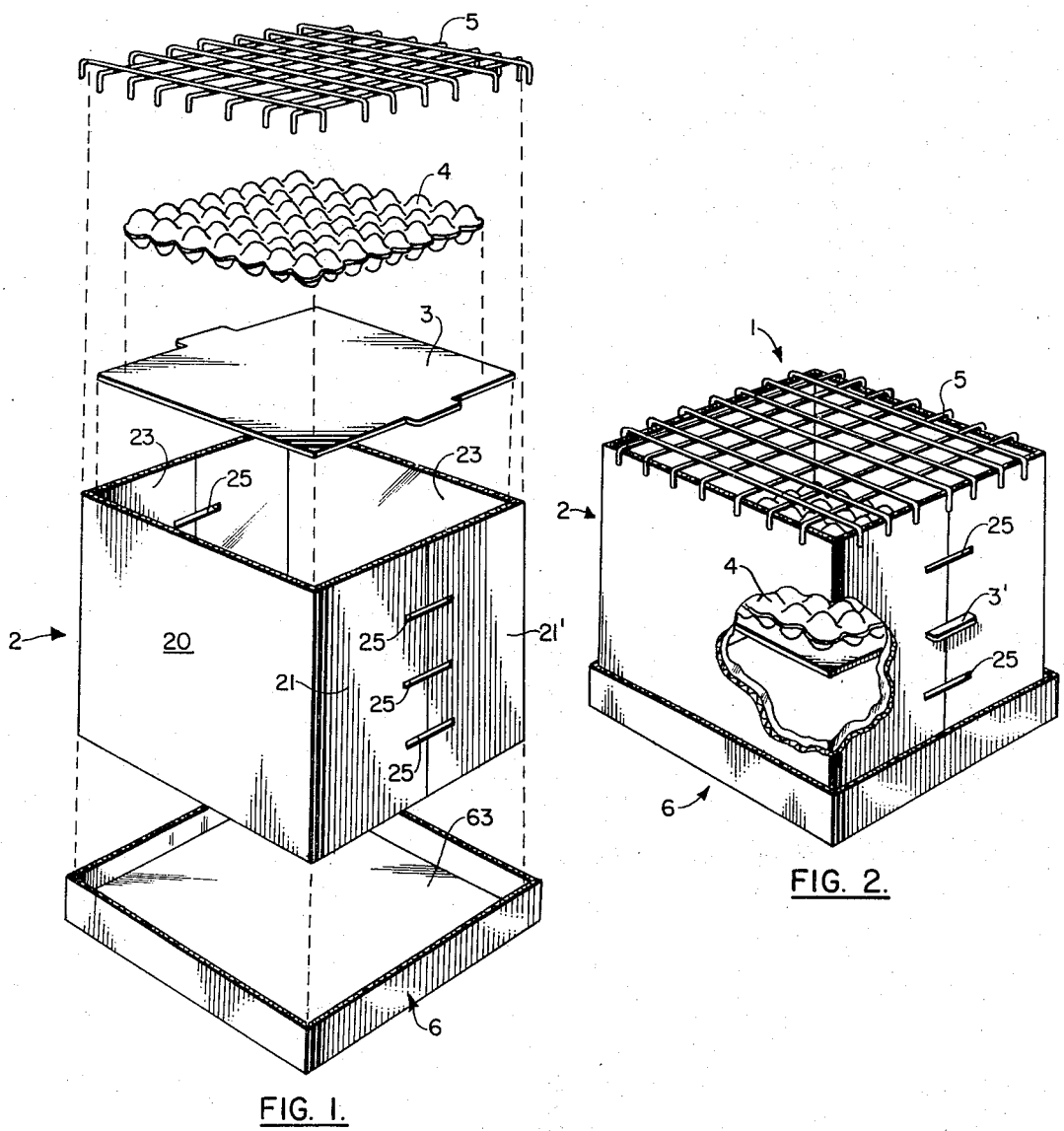

INVENTOR
GEORGE A. MOLLERE
BY C. Emmett Pugh
ATTORNEY

PORTABLE DISPOSABLE CHARCOAL GRILL

BACKGROUND OF THE INVENTION

The present invention relates to a charcoal or barbeque grill which is completely self-contained, truly portable, easily disposable after use and yet has the features and full cooking ability of the standard barbeque grill.

One of the most favorite American pastimes is the outdoor cookout wherein a charcoal grill is used to barbeque chicken, steaks, hamburgers and other foods, particularly for picnics and the like. Normally for such use a standard permanent metal charcoal grill available in various sizes and configurations is used. An example of such a grill is generally illustrated in the patent to Karapetian (FIGS. 1 and 5), U.S. Pat. No. 3,509,814. However, there has been a great deal of inconvenience associated with the use of such grills, particularly when transportation of the grill was involved. Usually it would be necessary to: disassemble the relatively heavy and clumsy grill and stow it in preparation for the picnic trip, unpack and assemble it at the picnic site, add fuel and starting fluid and ignite, complete the necessary cooking and allow the grill to cool, dispose of the fuel residue and finally clean, disassemble and stow it for the return trip. In contrast, the present invention comes provided in a relatively small, compact package, is easily assembled together in seconds and, because of its relative inexpensiveness, is thrown away into any convenient trash receptacle after use.

Heretofore, there have been various attempts to provide a truly portable and disposable grill. However, these attempts have all failed because they did not fully achieve the objects of portability or practical disposability, were relatively expensive or cumbersome or because they could not satisfactorily perform their cooking function, certainly not to the quality and functional level of the standard metal barbeque grill. Examples of such prior art grills are:

| Patent No. | Inventor |
| --- | --- |
| No. 2,334,847 | Spiers |
| No. 2,918,051 | Broman |
| No. 2,965,096 | Barton |
| No. 2,981,249 | Russel et al. |
| No. 3,109,420 | Ott et al. |
| No. 3,146,773 | Melzer |
| No. 3,353,527 | Anderson |
| No. 3,394,693 | Robinson |
| No. 3,428,039 | Desmoulins |
| No. 3,478,733 | Meyerhoefer |
| No. 3,491,743 | Temp |

The present invention offers a new approach and structure which results in greatly increased convenience, flexibility of use and ease of disposal. Among its many advantages are:

1. The unit is inexpensive, costing a mere dollar or two;
2. The unit is easily transportable and as purchased, measures only 13 × 13 × 2½ inches and is contained in a small, compact rectangular package;
3. The unit is complete, and includes all components necessary for one use; that is, the grill body, instant starting fuel, and a grating for use as a cooking surface;
4. Assembly is easy, straight-forward and takes no particular skill; indeed the unit may be assembled by one person in less than 1 minute;
5. An additional feature is the presence of a lower food warming oven, suitable inter alia for preparing "brown and serve" bread products;
6. The unit is safe; the fire retardant paper or cardboard from which the unit is made is consumable but will not support combustion; the foil liner can be turned over all exposed paper edges to limit exposure to flame; and the potential of a grease fire has been reduced by designing the fire pan so that it will not trap grease;
7. The base features a reflective internal surface to prevent thermal damage to whatever surface the grill is placed upon;
8. Integral insulated lifting handles can be provided for moving the unit while in use; and
9. The unit is completely disposable and can be discarded in any convenient trash container once the fire has been extinguished.

BRIEF DESCRIPTION OF THE DRAWINGS

FIG. 1 is an exploded, perspective view of the elements of the grill of the present invention as they would fit together when assembled for use;

FIG. 2 is a perspective view of the assembled grill, partially cut-away to show the interior of the grill;

DESCRIPTION OF THE PREFERRED EMBODIMENT

Figure 3:
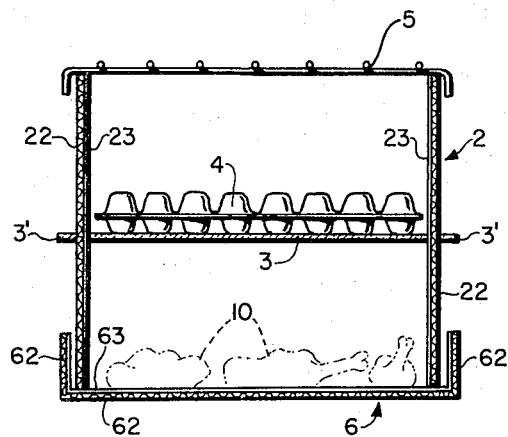
FIG. 3 is a cross-sectional, side view of the assembled grill.

As shown particularly in FIGS. 1 and 2, the present invention comprises a charcoal or barbeque grill 1 including a basic body element 2, a fire pan 3, charcoal briquettes 4, grill 5 and a base 6. When in use, as shown in FIGS. 2 and 3, the basic body element 2 supports within it the fire pan 3 and at its top the grill 5. The charcoal or other heat producing element 4 rests on the fire pan 3 and, when ignited, the grill 1 is used to cook meats and the like on its grilled surface 5.

Figure 4:
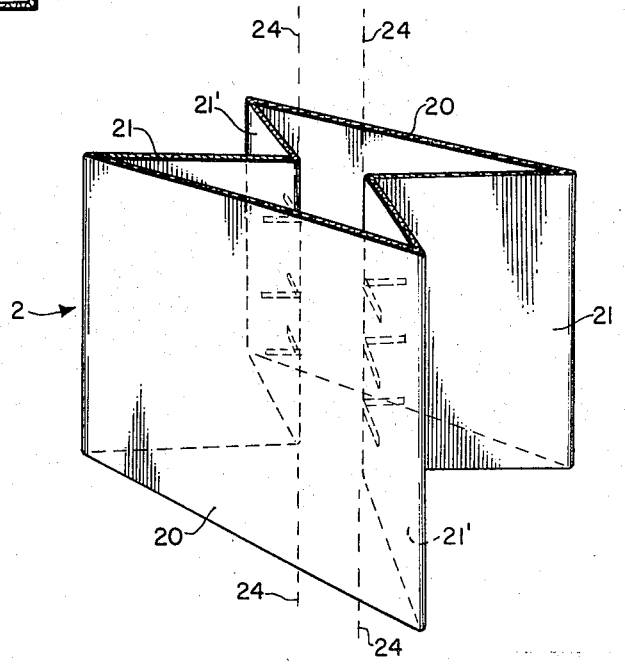
FIG. 4 is a perspective view of the basic body element of the grill in partially collapsed position.
Figure 5:
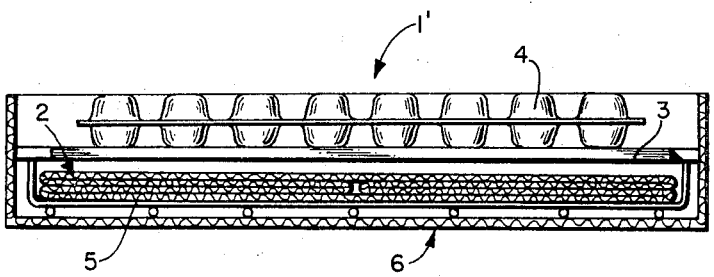
FIG. 5 shows the elements of the grill nested together for packaging and transportation.

The basic body element 2 is comprised of a square corrugated paper or cardboard material 22 which can measure for example 12 × 12 inches in horizontal cross-section and 11 inches in height. The corrugated paper 22 is fire retardant and a rating of 100 pound bursting strength has been found satisfactory. A heat reflecting laminate 23 of 1 mil aluminum foil is secured to the inside surface of the tube 2 by means of, for example, a thermosetting adhesive. A series of slots 25 varying in height location are provided in the side portions 21–21' of the basic body tube 2. Sides 21–21' also include two opposed vertical accordian-type folds 24 (note FIG. 4) which allow the tube 2 to be collapsed or folded flat. As shown in FIG. 5, the folds 24 open in opposite directions so that, when collapsed, the sides 21–21' fold inwardly.

The fire pan 3, having a little under a 12 × 12 cross-section is provided with two opposing dog ears 3' which are inserted into the selected slots 25 for mounting the fire pan 3 in the basic tube 2 at the desired level location. Because the slots 25 and the folds 24 are located in the side portions, the inherent resiliency of the cardboard 22 caused by the presence of the folds 24 provides an inward, compressive bias or force locking or securely holding the fire pan 3 in place. The placement of the fire pan 3 as to slot level is determined by the temperature desired at the grill 5.

Although the dog ear 3' and slot 25 combination illustrated provides a particularly simple and relatively inexpensive structure for supporting the fire pan 3, it may be desirable to allow greater ease in changing the fire pan level to permit the varying of the level during, for example, the barbequeing of a steak. For such greater flexibility one could use an alternate support, for example, a set of vertically extending wire supports (not illustrated) which could hook into the corners of the fire pan 3 (eliminating the dog ears 3' and slots 25). The wire supports could have a series of reverse hooks along their length to hook over the top of the tube 2. The level could then be changed by merely raising the supports to unhook them from the top and rehooking the supports at the desired level.

The fire pan 3 can be fabricated from, for example, 20 mil steel. To prevent grease drippings from building up across the pan and causing an uncontrolled grease fire from occurring, grooves (not illustrated) could be stamped into the pan 3 to allow the grease to drip off the pan surface or otherwise collected at one or two limited spots away from the fuel area.

A 12 × 12 inch expanded metal or wire grill 5 is used as the cooking surface. The grill 5 is fabricated with a downwardly extending one inch lip on all sides to secure the grill 5 to the top of the tube 2.

The base 6 can be of the same materials structure as the tube 2 including the same corrugated paper or cardboard 62 with a laminated heat reflective layer 63 of aluminum foil. The base element 6 can have horizontal, cross-sectional dimensions of for example 13 × 13 with side walls of 2½ inches high.

The base 6 serves three basic functions: (a) it provides a heat reflective surface 63 which prevents any burning or damage to the surface (grass, table, etc.) upon which the unit 1 is used; (b) it along with the lower portion of the tube 2 provides an oven or food warming area; and (c) it can be used as the basic outer package or shipping container (note FIG. 5) during the selling, shipping and transportation segments of the unit's life.

The food warming compartment can be used to keep the food 10 (note FIG. 3) warm after it has been cooked on the grill 5. The lower portion of the unit 1 also serves as an oven in which the user can prepare, inter alia, "brown and serve" type products. The basic tube 2 can be further slotted or have a series of air vent holes or rectangular cut-outs provided in it near its base in side portions 20 or 21 – 21' to promote air circulation and stabilize the oven temperature as desired, for example, to approximately 300° F. As a further safeguard to prevent over-heating of the corrugated paper or cardboard 22, the outer skin of the corrugated structure can be removed at the bottom of the tube 2 so as to permit air circulation up through the corrugations for cooling purposes.

To facilitate moving the unit 1 around while in use and hence while it is hot, and to allow easy pick-up of the tube 2 from the base 6 permitting access to the food 10, integral handles (not illustrated) can be cut into or stamped out of the top portion of the tube 2. A particular advantageous way to provide these handles is to slit all four upper corners of the tube 2 about one inch down in a vertical direction. The top edges of the sides 20, 21 – 21' can then be folded out and down providing an inverted V-shaped cuff for handles. This structure results in two additional advantages by giving an aluminum foil surface at the upper edge resisting any charring of the tube 2 and giving a resilient friction locking action for holding the grill 5.

The fuel or briquette element 4 is, for convenience, preferably of the one piece or integral, instant start type which requires no starting fluid. An example of such an instant start fuel unit is disclosed in the patent to Mustin et al., U.S. Pat. No. 2,933,378, and is sold under the trademark "Brix" (Timberland Products Co., Inc.). Another suitable instant or "self starting" fuel element is that sold under the trademark "Touch & Glo" (Great Lakes Charcoal Products Corp.). Other "self starting" fuel elements are available or alternatively, of course, there are the standard, loose charcoal briquettes with starter fluid. The thickness of the corrugated paper 22 and the aluminum foil layer 23 of the tube 2 may have to be varied depending on the amount of flaming present during start-up for the particular fuel element being used.

In the preferred embodiment sufficient fuel 4 is included for one use of the grill unit 1. However, even though the unit 1 is basically designed for a one use/disposable operation, it unlike some prior art attempts has substantial durability and can be reused a multiple number of times if so desired.

As illustrated in FIG. 5, because of the complete collapsibility of the unit 1 and the substantial flatness and compactness of its various elements, the elements can be packed together for shipping, sale and transporting prior to use in a relatively small, compact unit 1' with all the elements nested together. The base element 6 with its upwardly extending side walls can serve as the basic container or package with the other elements nested therein. For example, the other elements can be nested as follows: the grill 5 is placed up-side-down with the collapsed tube body 2 placed within it; and on top of the nested tube/grill 2 – 5 is placed the fire pan 3 and the packaged fuel unit 4. A transparent, overprinted wrap could then be provided over the exterior of the unit 1' to provide a finished package.

The assembly of the grill is simply and quickly achieved. The procedure is as follows;

1. Any outer wrapping is removed from the unit 1' and discarded;
2. The tube 2 is removed from the base package 6 and unfolded;
3. The fire pan 3 is inserted into and attached to the tube by means of inserting dog ears 3' into the desired slots 25;
4. The tube 2 is placed in the mounting base 6;
5. The charcoal pack 4 is placed in the fire pan;
6. The charcoal is lit; and
7. The expanded metal or wire grill 5 is placed on top of the grill.

After the fuel 4 has reached its cooking condition, the unit 1 is ready for use.

The portable grill 1 is designed to be as intrinsically safe as is practical. The interior foil surfaces 23 and 63 have during tests resisted a flame of 400° F. indefinitely without charring the outside paper surface 20, 21 – 21'. The paper is treated with a fire retardant liquid and will not support combustion. The outside surface temperature of the body element 2 stabilizes at 135° F. when in use. The outside bottom surface temperature of the mounting base is typically 85° F. when in use.

Although having some slits, cut-out portions and/or slots in its surface, the tube 2 nonetheless has a substantially solid surfaced exterior particularly in its upper portion. This structure serves to contain and conserve the heat produced by the fuel element 4 and, unlike those prior art grills of perforated or expanded metal or wire basic structures, allows the unit 1 to function as well as and in some cases better than the permanent metal grills. The type of structure also allows greater ease of handling and provides greater durability.

Although primarily intended for use as a portable barbeque grill, the present invention could be converted for other applications as well, such as being used as a portable hand or baby bottle warmer or as a portable incinerator.

There are, of course, many variables to be taken into account in designing the exact details and dimensions of the unit 1. The amount of maximum heat to be given off by the fuel element 4 during use and the maximum amount of flaming during fuel start-up will usually dictate the thickness of the foil layer 23. The general size and location of the air vent holes or slots, the position of the fire pan, the size of the lower compartment and the temperature heating characteristics of the fuel 4 will determine the temperature level of the oven or food warming compartment.

Because many varying and different embodiments may be made within the scope of the inventive concept herein taught, and because many modifications may be made in the embodiment herein detailed in accordance with the description requirements of the law, it is to be understood that the details herein are to be interpreted merely as illustrative and not in a limiting sense.

What is claimed as invention is:

1. Portable and disposable charcoal grill means comprising:
   a. rectangular main frame means having four essentially solid upright wall portions defining a hollow open ended structure; said means being fabricated from a disposable corrugated paper material provided with a layer of aluminum foil over its interior surfaces; said means also being further defined in that a pair of its opposing wall portions are provided with vertically extending grooves along which the adjacent wall portions are allowed inwards toward each other in an accordian type fashion whereby said main frame means can be collapsed to a flat condition and nestled within base means as hereinafter defined, the presence of the accordian type folds and the inherent resiliency of the corrugated paper material providing an inward, resilient, compressive bias between said opposing wall portions; the upright opposing wall portions of said main frame means having said grooves therein being also provided with a series of horizontally extending slots provided at various elevations for supporting fuel support means as hereinafter defined;
   b. rectangular shape base means adapted to receive and close off the bottom of said main frame means when the latter is positioned therein in expanded operable condition, said base means also being fabricated of a corrugated paper material having a layer of aluminum foil thereon; said base means being further characterized in that it is provided with upwardly extending side walls sufficient to receive in a nestling relationship said main frame means when collapsed as well as grill and fuel support means as hereinafter defined;
   c. rectangular shaped grill means adapted to fit over the top opened end of said main frame means when operably positioned thereon; said grill means also being adapted to fit within said base means in a nestling relationship; and
   d. rectangular shaped fuel support means adapted to fit within the hollow space defined within said main frame means so as to define in combination with said base means and the wall portions of said main frame means an enclosed chamber; said fuel support means being further defined in that it is provided with extended portions on two of its opposite sides adapted to fit within the horizontally extending slots provided within the wall portions of said main frame means said fuel support means being securely held within said main frame means by said resilient, compressive bias between said opposing wall portions whereby said fuel support means can be horizontally supported at various elevations within said main frame means; said fuel support means being also further defined in that it is of a configuration whereby it can be nestled within said base means.

2. The charcoal grill means of claim 1 wherein said rectangular shaped grill means forms an open grill structure having along its periphery a downwardly extending lip on all sides to secure said rectangularly shaped grill means to said main frame means.

* * * * *